(12) United States Patent
Shimizu (10) Patent No.: US 7,693,350 B2
(45) Date of Patent: Apr. 6, 2010

(54) PIXEL INTERPOLATION DEVICE AND CAMERA ADAPTED TO PERFORM PIXEL INTERPOLATION OF CAPTURED IMAGE

(75) Inventor: Hiroshi Shimizu, Tokyo (JP)

(73) Assignee: Casio Computer Co., Ltd., Tokyo (JP)

( * ) Notice: Subject to any disclaimer, the term of this patent is extended or adjusted under 35 U.S.C. 154(b) by 1139 days.

(21) Appl. No.: 11/317,161

(22) Filed: Dec. 22, 2005

(65) Prior Publication Data

US 2006/0152597 A1 Jul. 13, 2006

(30) Foreign Application Priority Data

Dec. 27, 2004 (JP) ............................... 2004-377373

(51) Int. Cl.
*G06K 9/32* (2006.01)
(52) U.S. Cl. ....................... 382/300; 382/205; 382/260; 382/275; 348/448; 348/452; 348/458; 348/581
(58) Field of Classification Search ................. 348/448, 348/452, 458, 607, 700, 200; 382/300
See application file for complete search history.

(56) References Cited

U.S. PATENT DOCUMENTS

| | | | | |
|---|---|---|---|---|
| 4,872,188 A | * | 10/1989 | Lauro et al. ................... | 378/62 |
| 5,008,752 A | * | 4/1991 | Van Nostrand ............... | 348/581 |
| 5,125,042 A | * | 6/1992 | Kerr et al. .................... | 382/300 |
| 5,125,048 A | * | 6/1992 | Virtue et al. ................. | 382/205 |
| 5,189,529 A | * | 2/1993 | Ishiwata et al. .............. | 358/451 |
| 5,208,875 A | * | 5/1993 | Virtue et al. ................. | 382/260 |
| 5,315,415 A | | 5/1994 | Kawai et al. | |
| 5,353,059 A | * | 10/1994 | Lawlor et al. ........... | 375/240.11 |
| 5,365,604 A | * | 11/1994 | Kwok et al. ................. | 382/275 |
| 5,793,435 A | * | 8/1998 | Ward et al. .................. | 348/448 |

(Continued)

FOREIGN PATENT DOCUMENTS

EP 0 814 429 A2 12/1997

(Continued)

OTHER PUBLICATIONS

Julius O, Smith and Phil Gossett "A Flexible Sampling.Rate Conversion Method", IEEE 1994, p. 19.4.2-19.4.4.*

(Continued)

*Primary Examiner*—Brian Q Le
*Assistant Examiner*—Mekonen Bekele
(74) *Attorney, Agent, or Firm*—Frishauf, Holtz, Goodman & Chick, P.C.

(57) ABSTRACT

A camera includes an image capture unit which captures the image of a subject to obtain image data, a pixel interpolation unit which, on the basis of pixel data from multiple pixels arranged on a line in the image data obtained by the image capture unit, creates image data in an interpolation position on the line, and a storage unit which is stored with common coefficient data for pixel data from multiple pixels which are n-th pixels counted from the interpolation position in opposite directions on the line, the pixel interpolation unit performing interpolation operations on the pixel data from the n-th pixels using the coefficient data stored in the storage unit to thereby create the image data in the interpolation position.

12 Claims, 6 Drawing Sheets

U.S. PATENT DOCUMENTS

| | | | | |
|---|---|---|---|---|
| 5,802,218 | A | * | 9/1998 | Brailean .................. 382/275 |
| 5,847,714 | A | * | 12/1998 | Naqvi et al. ............... 345/668 |
| 5,973,745 | A | * | 10/1999 | Kondo .................. 348/421.1 |
| 6,028,589 | A | * | 2/2000 | Mehra et al. ............... 345/603 |
| 6,188,803 | B1 | * | 2/2001 | Iwase et al. ............... 382/300 |
| 6,275,836 | B1 | * | 8/2001 | Lu .......................... 708/313 |
| 6,680,782 | B1 | * | 1/2004 | Jamzadeh ................ 358/1.14 |
| 6,801,922 | B2 | * | 10/2004 | Goszewski et al. ......... 708/313 |
| 7,110,620 | B2 | * | 9/2006 | Shim et al. ............... 382/300 |
| 7,580,461 | B2 | * | 8/2009 | Li et al. ................ 375/240.18 |
| 2009/0123083 | A1 | * | 5/2009 | Kawase et al. ............ 382/254 |
| 2009/0161948 | A1 | * | 6/2009 | Takahashi et al. .......... 382/160 |
| 2009/0190030 | A1 | * | 7/2009 | Nix et al. ................... 348/452 |

FOREIGN PATENT DOCUMENTS

| | | | |
|---|---|---|---|
| JP | 05-7584 | * | 1/1993 |
| JP | 05-007584 | * | 1/1993 |
| JP | 5-7584 A | | 1/1993 |
| JP | 10-63828 A | | 3/1998 |
| TW | 398141 | | 7/2000 |
| TW | 578117 | | 3/2004 |
| TW | 1228915 B | | 3/2005 |

OTHER PUBLICATIONS

L P Yaroslavsky, "Signal sinc-interpolation: a fast computer algorithm", Bioimaging 4 (1996), pp. 225-231.*

Frank Candocia and Jose C. Principe, "Comments on Sinc Interpolationof Discrete Periodic Signals", IEEE Transactions on Signal Processing, vol. 46, No. 7, Jul. 1998, pp. 2044-2047.*

Taiwanese Office Action (and English translation thereof) dated Oct. 1, 2008, issued in a counterpart Taiwanese Application.

* cited by examiner

FIG.2

FIG.3A
GRAPH OF sinc FUNCTION

FIG.3B
RELATIONSHIP AMONG INTERPOLATION POSITION, EXISTING PIXEL POSITIONS AND COEFFICIENTS

| INTERPOLATION POSITION t | 0 | 0.125 | 0.25 | 0.375 | 0.5 | 0.625 | 0.75 | 0.875 |
|---|---|---|---|---|---|---|---|---|
| LUT ADDRESS | 0 | 1 | 2 | 3 | 4 | 5 | 6 | 7 |
| $P_0$ ENLARGEMENT COEFFICIENT | 0 | 5 | 8 | 8 | 7 | 4 | 2 | 0 |
| $P_1$ ENLARGEMENT COEFFICIENT | 0 | 22 | 34 | 38 | 35 | 27 | 17 | 8 |
| $P_2$ ENLARGEMENT COEFFICIENT | 0 | 250 | 228 | 197 | 156 | 112 | 69 | 31 |
| $P_3$ ENLARGEMENT COEFFICIENT | 0 | 31 | 69 | 112 | 156 | 197 | 228 | 250 |
| $P_4$ ENLARGEMENT COEFFICIENT | 0 | 8 | 17 | 27 | 35 | 38 | 34 | 22 |
| $P_5$ ENLARGEMENT COEFFICIENT | 0 | 0 | 2 | 4 | 7 | 8 | 8 | 5 |

FIG.5B

| LUT ADDRESS | 0 | 1 | 2 | 3 | 4 | 5 | 6 | 7 |
|---|---|---|---|---|---|---|---|---|
| $P_0$ ENLARGEMENT COEFFICIENT (4bit) | 0000 | 0101 | 1000 | 1000 | 0111 | 0100 | 0010 | 0000 |
| $P_1$ ENLARGEMENT COEFFICIENT (6bit) | 000000 | 010110 | 100010 | 100110 | 100011 | 011011 | 010001 | 001000 |
| $P_2$ ENLARGEMENT COEFFICIENT (8bit) | 00000000 | 11111010 | 11100100 | 11000101 | 10011100 | 01110000 | 01000101 | 00011111 |
| $P_3$ ENLARGEMENT COEFFICIENT (8bit) | 00000000 | 00011111 | 01000101 | 01110000 | 10011100 | 11000101 | 11100100 | 11111010 |
| $P_4$ ENLARGEMENT COEFFICIENT (6bit) | 000000 | 001000 | 010001 | 011011 | 100011 | 100110 | 100010 | 010110 |
| $P_5$ ENLARGEMENT COEFFICIENT (4bit) | 0000 | 0000 | 0010 | 0100 | 0111 | 1000 | 1000 | 0101 |

FIG.6A
FIG.6B
FIG.6C

PIXEL INTERPOLATION DEVICE AND CAMERA ADAPTED TO PERFORM PIXEL INTERPOLATION OF CAPTURED IMAGE

CROSS-REFERENCE TO RELATED APPLICATIONS

This application is based upon and claims the benefit of priority from prior Japanese Patent Application No. 2004-377373, filed Dec. 27, 2004, the entire contents of which are incorporated herein by reference.

BACKGROUND OF THE INVENTION

1. Field of the Invention

The present invention relates to a pixel interpolation device for pixel interpolation in enlarging or reducing image data and a camera, such as a digital still camera, a digital video camera, or the like, which has the pixel interpolation device built in to provide a pixel interpolation function used in digitally enlarging or reducing a captured image.

2. Description of the Related Art

In general, cameras, such as digital still cameras, digital video cameras, etc., have a digital zoom function built in, which is adapted to enlarge or reduce an image without using optical operations/functions. Such cameras responds to a zoom operation by the user to enlarge or reduce (zoom in or out) an image by creating (interpolating) pixel data of the enlarged or reduced image on the basis of pixel data from the original image. At this point, the pixel data is created by performing operations on multiple pieces of existing pixel data and interpolation coefficients selected according to the interpolation position.

For example, an image enlarging device has been proposed in Japanese Unexamined Patent Publication No. 5-7584. According to this device, data from at least four neighbor pixels arranged in one of the horizontal and vertical directions are each multiplied by a given coefficient. The resulting products are then added together to thereby produce pixel data to be inserted between the two central ones of the four pixels. Further, at least four pieces of pixel data previously created and arranged in the other of the horizontal and vertical directions are each multiplied by a given coefficient. The resulting products are then added together to thereby create pixel data to be inserted between the central two pieces of pixel data.

Also, an imaging device has been proposed in Japanese Unexamined Patent Publication No. 10-63828, which enlarges an image formed by an array of pixels each containing digital data by interpolating between adjacent pixels in the image. This device includes a memory in the form of a lookup table which is stored with filter coefficients representing a spline weighting function and an operation circuit adapted to use the coefficients to calculate pixel values to be interpolated in the enlarged image.

Thus, the conventional image enlarging devices perform operations using coefficients on pixel data but merely use a table stored with general-purpose coefficient data and an operations circuit which do not take the features of coefficients in enlargement interpolation into consideration. Therefore, the table (memory) and the operation circuits have to become redundant in circuit arrangement, which may result an increase in circuit scale.

BRIEF SUMMARY OF THE INVENTION

An object of the present invention is to reduce the circuit scale of a pixel interpolation device by utilizing the characteristics of coefficients used in enlargement interpolation of an image.

According to an aspect of the invention, there is provided a camera comprising: an image capture unit which captures the image of a subject to obtain image data; a pixel interpolation unit which, on the basis of pixel data from multiple pixels arranged on a line in the image data obtained by the image capture unit, creates image data in an interpolation position on the line; and a storage unit which is stored with common coefficient data for pixel data from multiple pixels which are n-th pixels counted from the interpolation position in opposite directions on the line, the pixel interpolation unit performing interpolation operations on the pixel data from the n-th pixels using the coefficient data stored in the storage unit to thereby create the image data in the interpolation position.

According to another aspect of the invention, there is provided a pixel interpolation device which, on the basis of pixel data from multiple pixels arranged on a line, creates pixel data in an interpolation position on the line, comprising: a controller which provides interpolation position data indicating an interpolation position; a coefficient table which is stored with common coefficient data for pixel data from multiple pixels which are n-th pixels counted from the interpolation position in opposite directions on the line, the table storing coefficient data for each position that is taken as an interpolation position; a coefficient data output unit which outputs coefficient data for pixel data from each of the n-th pixels from the coefficient table in accordance with the position indicated by the interpolation position data from the controller; a buffer unit which stores pixel data from the multiple pixels on the line; and an operations unit which performs operations on each pixel data stored in the buffer unit using corresponding coefficient data output from the coefficient table by the coefficient data output unit.

According to still another aspect of the invention, there is provided a pixel interpolation device comprising: a capture unit which captures pixel data from existing pixels arranged at regular intervals; a specify unit which specifies an interpolation position in which an interpolated pixel is to be located; an image data output unit which outputs pixel data from multiple existing pixels located close to the interpolation position specified by the specify unit from the pixel data captured by the capture unit; a storage unit which is previously stored with multiple coefficient data according to a positional relationship between the interpolated pixel and the existing pixels; a coefficient data output unit which outputs from the storage unit multiple pieces of coefficient data for pixel data from the existing pixels output by the pixel data output unit; and an image data creation unit which creates pixel data in the interpolated position specified by the specify unit by performing predetermined operations on the pixel data output by the pixel data output unit and the coefficient data output by the coefficient data output unit, the storage unit storing either of coefficient data when the existing pixels are in a first direction with respect to the interpolated pixel and coefficient data when the existing pixels are in a second direction opposite to the first direction, and the coefficient data output unit outputting the coefficient data when the existing pixels are in the first direction with respect to the interpolated pixel and the coefficient data when the existing pixels are in the second direction with respect to the interpolated pixel on the basis of the coefficient data stored in the storage unit.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

An embodiment of the present invention will be described hereinafter with reference to the accompanying drawings.

Figure 1:
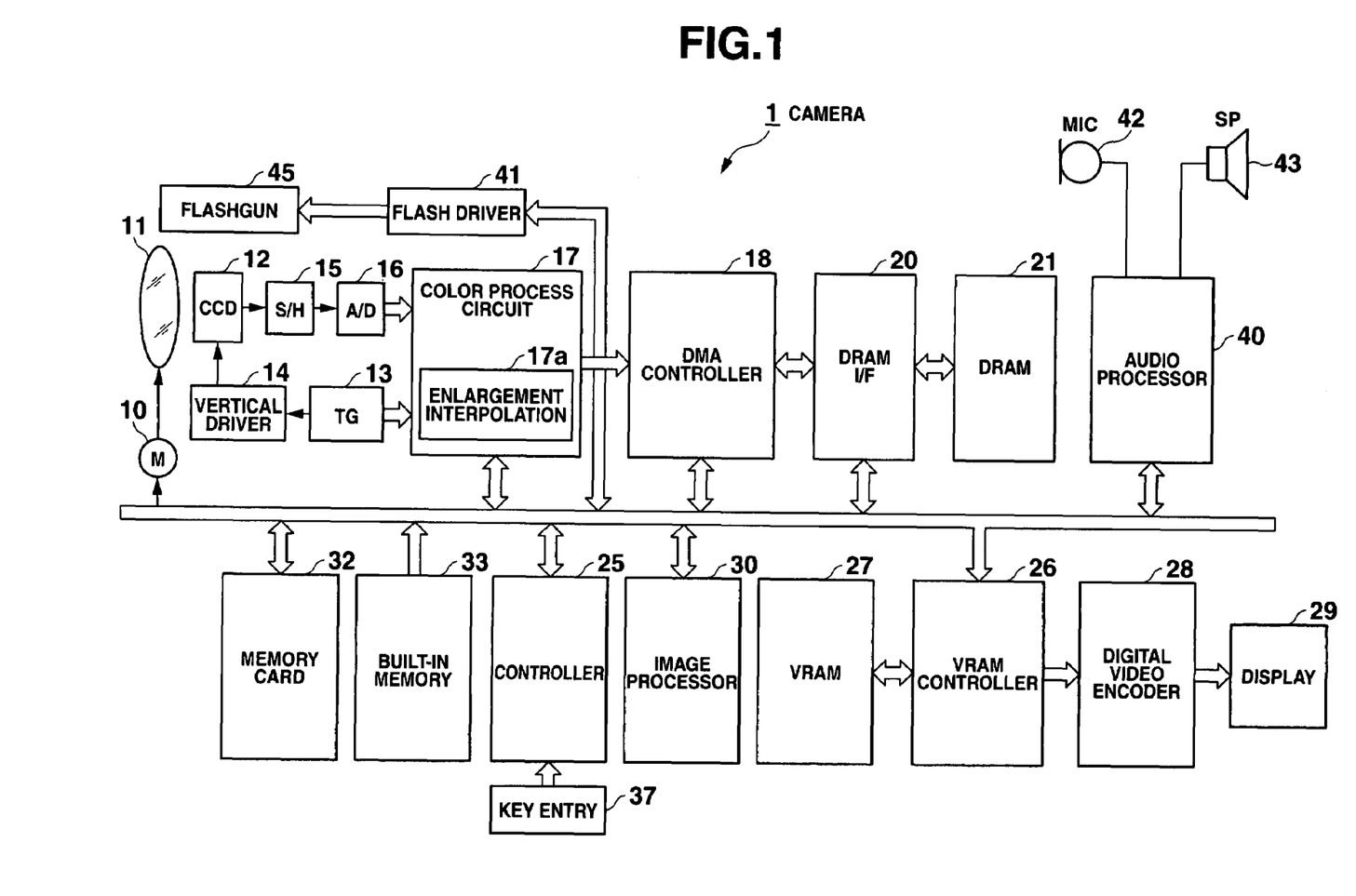
FIG. 1 is a block diagram of a camera having a built-in pixel interpolation device according to an embodiment of the present invention.

FIG. 1 is a block diagram of a camera having a built-in pixel interpolation device according to an embodiment of the present invention.

In this camera which is generally indicated at 1 in FIG. 1, in the capture mode which is the basic mode, a taking lens 1 is driven by a motor (M) 10 to move into the aperture position or normal shooting position. A CCD (Charge Coupled Device) 12, placed at the back of the taking lens 11 and composed of a large number of pixels arranged in matrix form, is scan driven by a timing generator (TG) 13 and a vertical driver 14 to output a frame of pixel signals.

The pixels signals are subjected to gain adjustment for each of the primary colors R, G and B in the form of analog signals, then sampled and held in a sample and hold (S/H) circuit 15, converted into digital data in an A/D converter 16, and subjected to color processing including pixel interpolation and gamma correction in a color processing circuit 17, thereby producing digital brightness and color difference signals Y, Cb and Cr. The resulting digital signals are output to a DMA (Direct Memory Access) controller 18.

The color processing circuit 17 includes an enlargement interpolation section 17a corresponding to the pixel interpolation device of this embodiment. The enlargement interpolation section 17a carries out an enlargement interpolation process for enlarging an image under the control of a controller 25 associated with a digital zoom operation.

The DMA controller 18 temporarily writes the brightness signal Y and the color difference signals Cb and Cr from the color processing circuit 17 into its buffer and then DMA transfers them through a DRAM interface (I/F) 20 to a DRAM 21 as a buffer memory using a composite sync signal, a memory write enable signal, and a clock signal from the color processing circuit 17.

The controller 25 includes a CPU, a ROM recorded with operation programs executed by the CPU and data, and a RAM used as work storage and exercises control over the entire camera 1.

After the DMA transfer of the brightness and color difference signals to the DRAM 21, the controller 25 reads these signals through the DRAM interface 20 from the DRAM 21 and then writes them via a VRAM controller 26 into a VRAM 27.

A digital video encoder 28 periodically reads the brightness and color difference signals through the VRAM controller 26 from the VRAM 27 and produces a video signal on the basis of those signals. The video signal is then output to a display unit 29.

The display unit 29 serves as a monitor display unit (electronic viewfinder) in capture mode and makes a display based on the video signal from the digital video encoder 28. Thereby, an image (through image) based on image information from the VRAM controller 26 is displayed in real time on the display unit 29.

In a display state in which a trough image is displayed in real time on the display unit 29, when a shutter key in a key entry unit 37 is operated at a time a still image is captured, a trigger signal is produced.

In response to this trigger signal, the controller 25 stops the driving of the CCD 12 and then carries out an automatic exposure process to obtain proper exposure values. Thereby, the aperture of the lens optical system and the exposure time of the CCD 12 are controlled and then an image capture is carried out anew.

A frame of pixel data thus obtained is DMA transferred to and written into the DRAM 21. The controller 25 then reads one frame of pixel data written in the DRAM 21 and writes it into an image processor 30 where the input pixel data is JPEG (Joint Photographic Experts Group) encoded.

The JPEG-encoded pixel data is written into a removably attached memory card 32 as a recording medium of the camera 1 or a built-in memory 33 when the memory card is not loaded into the camera.

Upon completion of writing of one frame of pixel data into the memory card 32 or the built-in memory 33, the controller 25 resumes monitor display of a through image obtained from the CCD 12 via the DRAM 21 on the display unit 29.

To the controller 25 are connected the key entry unit 37, an audio processing unit 40, and a flash driver 41.

The key entry unit 37 includes a power key, the shutter key, a mode switch, a menu key, a select key, a zoom button, and a cursor control key. The signals resulting from operations of those keys are directly fed into the controller 25.

The audio processing unit 40 includes a sound source circuit, such as a PCM sound source. At the recording time, the audio processing unit digitizes an audio signal input from a microphone (MIC) 42 and compresses the digital audio signal according to a predetermined file format, say, the MP3 (MPEG-1 Audio Layer-3) standard to create an audio data file. The data file is sent to the memory card 32 or the built-in memory 33. At the time of audio reproduction, an audio data file from the memory card or the built-in memory is decompressed and converted into analog form to drive a loudspeaker (SP) 43.

Further, the audio processing unit 40, under the control of the controller 25, produces various operation sounds, such as a pseudo-shutter sound associated with an operation of the shutter key, beeps associated with operations of the other keys, etc., from the loudspeaker 43.

The flash driver 41 charges up a large-capacitance capacitor (not shown) connected to the flashgun 45 at still image capture time and then causes the flashgun to emit a flash of light under the control of the controller 25.

The pixel interpolation device (enlargement interpolation section 17a) of this embodiment will be described next.

Before describing a specific circuit arrangement (shown in FIG. 4) of the pixel interpolation device of this embodiment, a method of enlargement interpolation carried out by the enlargement interpolation section 17a will be described. A description is given here of an example of interpolating a certain point (interpolated point) from multiple existing pixels arranged in matrix form, e.g., 6×6 existing pixels shown in FIG. 2.

The procedure of interpolation operations on 6×6 existing pixels involves calculating one point from six existing pixels on a line in the horizontal or vertical direction as an interpolated pixel, repeating this process for each of the six lines to create six interpolated pixels, and calculating one point from the six interpolated pixels on a line in the vertical or horizontal direction in the same manner as with the six interpolated pixels. Although, in FIG. 2, operations are performed on multiple pixels existing on the same line, all the pixels need not necessarily exist on the same line. That is, the invention can be applied to interpolation using multiple pixels which can be regarded as existing on one common line, for example, delta arranged pixels. In the description which follows, suppose that pixels existing on the same line are used for interpolation operations to simplify the description.

Figure 2:
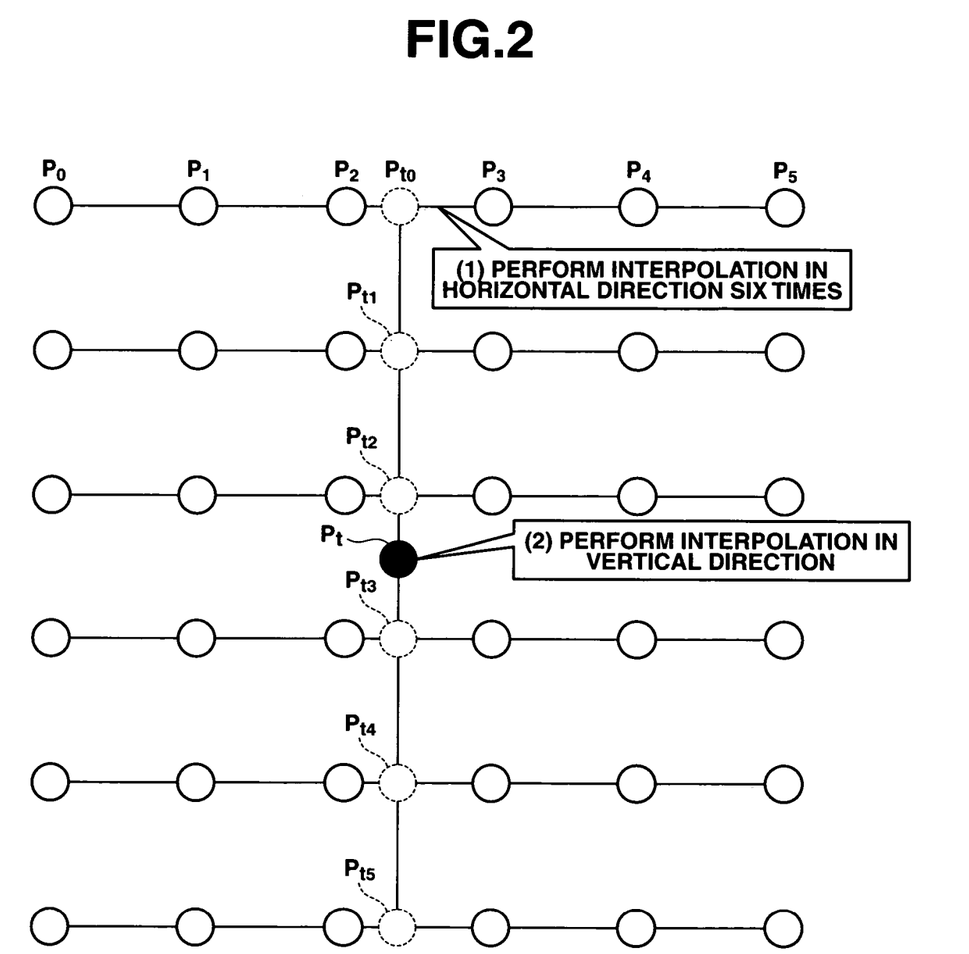
FIG. 2 shows a plurality of existing pixels arranged in matrix form on which enlargement interpolation processing is performed.

In FIG. 2, first, on the basis of six existing pixels P0 to P5 arranged on a line in the horizontal direction, a pixel Pt0 in the position of interpolation on the same line is created. In the same manner, pixels Pt1 to Pt5 are created on the basis of six interpolating pixels arranged on each of the horizontal lines. Then, on the basis of the six interpolated pixels Pt1 to Pt6 arranged on a vertical line, a pixel Pt at one point on that vertical line is calculated and interpolated.

In general, interpolation from successive pixels can be considered as convolution of successive pixels and a rectangular function (RECT function). The Fourier transform of the rectangular function is given by sinc $(t)=\sin(\pi t)/\pi t$.

In many cases, an approximate expression or lookup table (LUT) is used because the range of successive pixels used for operations is limited and the operations are complicated.

Interpolation coefficients based on a function using the sampling theorem which are frequently used in interpolation are expressed by $$f(t)=\sin(\pi t)/\pi t$$

Operations are performed within a range of existing pixels (i.e., the range/number of pixels used in convolution). Expressions which use existing pixels ranging from $-\infty$ to $\infty$ like the above expression are not general. Usually, a window function that corresponds to a finite number of existing pixels is used to suppress the filter characteristics to within a finite rage.

For example, the interpolation coefficients based on the lanczos 3lobbed window function are expressed by $$f(t)=\{\sin(\pi t)/\pi t\}\times\{\sin(\pi t/3)/(\pi t/3)\}$$

where $-3\leq t\leq 3$.

Assuming that the existing pixels at six points are represented by P0 to P5 and the interpolated pixel is represented by Pt, the value of Pt is represented by $$Pt=\Sigma f(tn)Pn$$

where tn is the distance from existing pixel Pn to Pt.

Suppose here that P2 and P3 are first neighbor pixels, P1 and P4 are second neighbor pixels, and P0 and P5 are third neighbor pixels.

In many cases, the convolution arithmetic circuit is used in various filter operations, such as LFP, HPF, etc., by making the coefficients versatile. In view of only the enlargement interpolation coefficients in the above function used in the sampling theorem, their values have characteristics which depend to some extent on t. The graph of $\sin(\pi t)/\pi t$ in the sampling theorem and the relationship between existing pixels and interpolated pixel have the following features 1, 2, and 3:

1. As the coefficients for n-th neighbor pixels 'e.g., P2 and P3), a value in the same interval can be used.

2. The coefficients for n-th neighbor pixels takes positive values if n is odd and negative values otherwise.

3. The larger n, the smaller the coefficient value.

The features 1, 2 and 3 will be explained in sequence. The feature 1 is explained first.

When the distance between P2 and Pt is 1, the positions of the respective existing pixels with respect to the interpolated pixel are represented by $-(t+2)$, $-(t+1)$, $-t$, $1-t$, $2-t$, and $3-t$. The positions of n-th neighbor pixels are represented by $-(t-n-1)$ and $n-1$. The enlargement coefficients for n-th neighbor pixels are obtained from $f(t)=\sin(\pi t)/\pi t$ as follows:

$$f(-(t-n-1))=\sin(-(t-n-1)\pi)/(-(t-n-1)\pi)=\sin((t-n-1)\pi)/(-(t-n-1)\pi)$$

Setting $t'=1-t$ leads the above expression to $$\sin((n-t')/(n-t')\pi=f(n-t')$$

Since $0\leq t\leq 1$ and $t'=1-t$, $0\leq t'\leq 1$.

The interpolation coefficients for n-th neighbor pixels can be covered by a value in the same interval. (This is also evident from that the function is an even function and the existing pixels are spaced at regular intervals. Even in a function which is limited to a finite range by a window function, such as the lanczos 3lobbed window function, this is evident because the window function is an even function.)

Next, the feature 2 will be explained.

The intervals of n-th neighbors are $n-1\leq tn\leq n$ and $-n\leq tn\leq 1-n$.

Taking only $n-1\leq tn\leq n$ as an example since the function is an even function, the function $\sin(\pi t)$ for the interval of n-th neighbors is $$f(tn)=\sin(\pi tn)/\pi tn$$

$f(tn)=0$ when tn is an integer other than 0. Also, $f'(tn)=(\pi^2\cos(\pi tn)-\sin(\pi tn)/\pi^2 tn^2$ From this, the inclination at $f(tn)=0$ when n is odd is $$f'(n-1)\geq 0 \text{ for } tn=n-1 (0 \text{ when } tn=0) \text{ and}$$

$$f'(n-1)<0 \text{ for } tn=n$$

When n is even, $$f'(n-1)<0 \text{ for } tn=n-1$$

$$f'(n-1)>0 \text{ for } tn=n$$

Therefore, in the interval of n-th neighbors, the coefficient becomes positive if n is odd and negative if n is even.

Figure 3A:
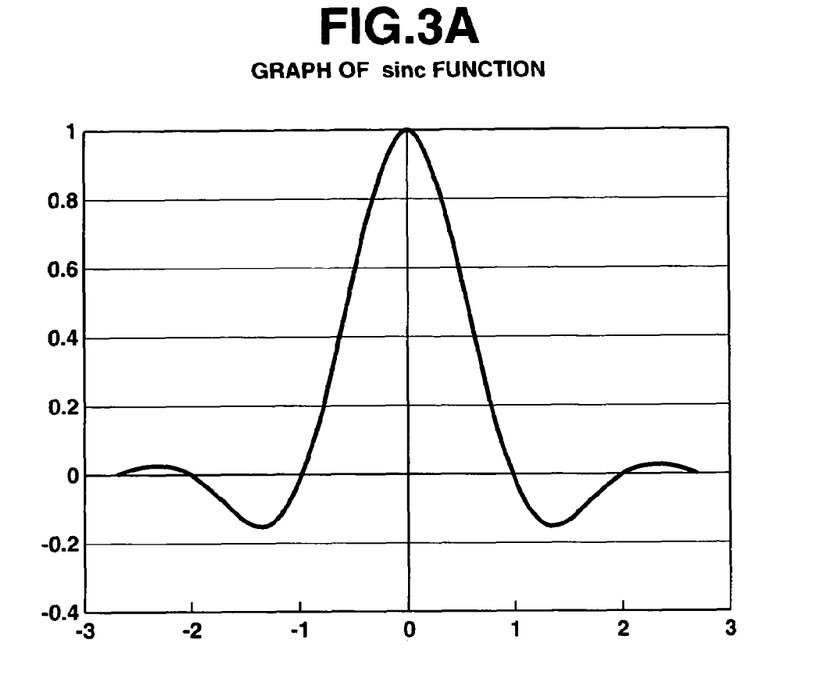
FIGS. 3A and 3B show function graphs for explaining coefficients for the existing pixels.
Figure 3B:
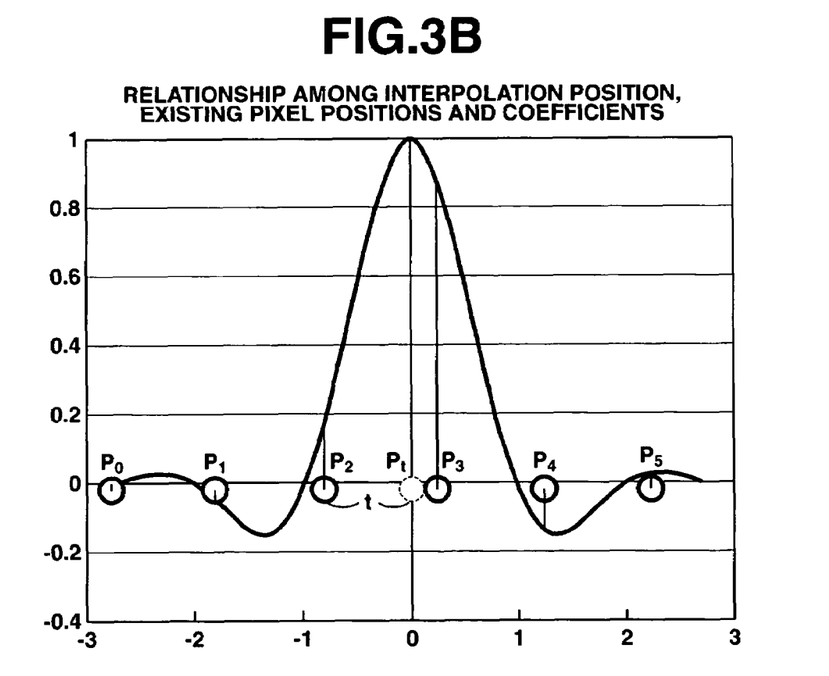

FIG. 3A shows a graph of sinc (t) function. FIG. 3B shows a relationship among the interpolation position (pixel Pt), the existing pixel positions (pixels P0 to P5), and coefficients for the existing pixels. The coefficient for each existing pixel (the value by which the pixel value is multiplied) is a value of f(t).

As shown in FIG. 3B, the values of coefficients for the first neighbor pixels P2 and P3 and the third neighbor pixels P0 and P5 are positive and the values of coefficients for the second neighbor pixels P1 and P4 are negative.

In FIGS. 3A and 3B, the values of coefficients are normalized to 1. On the circuit, use is made of values normalized to, say, 256 and the sum of products of existing pixel values and coefficients is divided by 256.

The feature 3 will be explained next.

The function in the denominator of the function f(t) is a periodic function. $1/\pi tn$ approaches 0 as t increases. Thus, the function f(t) converges to 0 as the absolute value of t increases.

As shown in FIGS. 3A and 3B, the larger the distance between Pn and Pt, the smaller the coefficient value for Pn is.

In view of the features 1, 2 and 3, the circuit scale can be reduced by imposing constraints on the circuit arrangement associated with the enlargement coefficients. The constraints include:

1. Not to store multiple pieces of coefficient data for n-th neighbor pixels in individual tales.
2. To perform convolution so that the coefficients for n-th neighbor pixels are treated as positive if n is odd and negative otherwise. Thereby, all the coefficient data can be stored as positive numbers in a table.
3. To reduce the bit width of registers storing coefficient data for n-th neighbor pixels in the table as the value of n increases.

Since the enlargement coefficients cannot be held with decimal points in circuit design, they are normalized to, say, 256. As a value for normalization, a value equal to a power of 2 is used in view of division by bit shifts.

In regarding the interpolated pixel position as being the same as or extremely close to the existing pixel position, the enlargement coefficient becomes 256 (normalized value) in order for the interpolated pixel to take a value comparable to that of the most neighbor existing pixel. If the normalization value is 256, this results in an increase in the bit width of coefficients only for 256, which is inefficient. In a configuration to change the enlargement characteristics by changing the values of coefficient data stored in a table, in order to allow enlargement processing using the most neighbor pixel-based method, the circuit is set such that the results of operations comparable to operations using 256 are output when the coefficient data for one of the first neighbor pixels which is closer to the interpolation position is 0 and 0 is output when the coefficient data for the other of the first neighbor pixels is 0. Thereby, desired enlargement interpolation coefficients can be obtained with an increase in the bit width of the table to store enlargement coefficient data checked.

Figure 4:
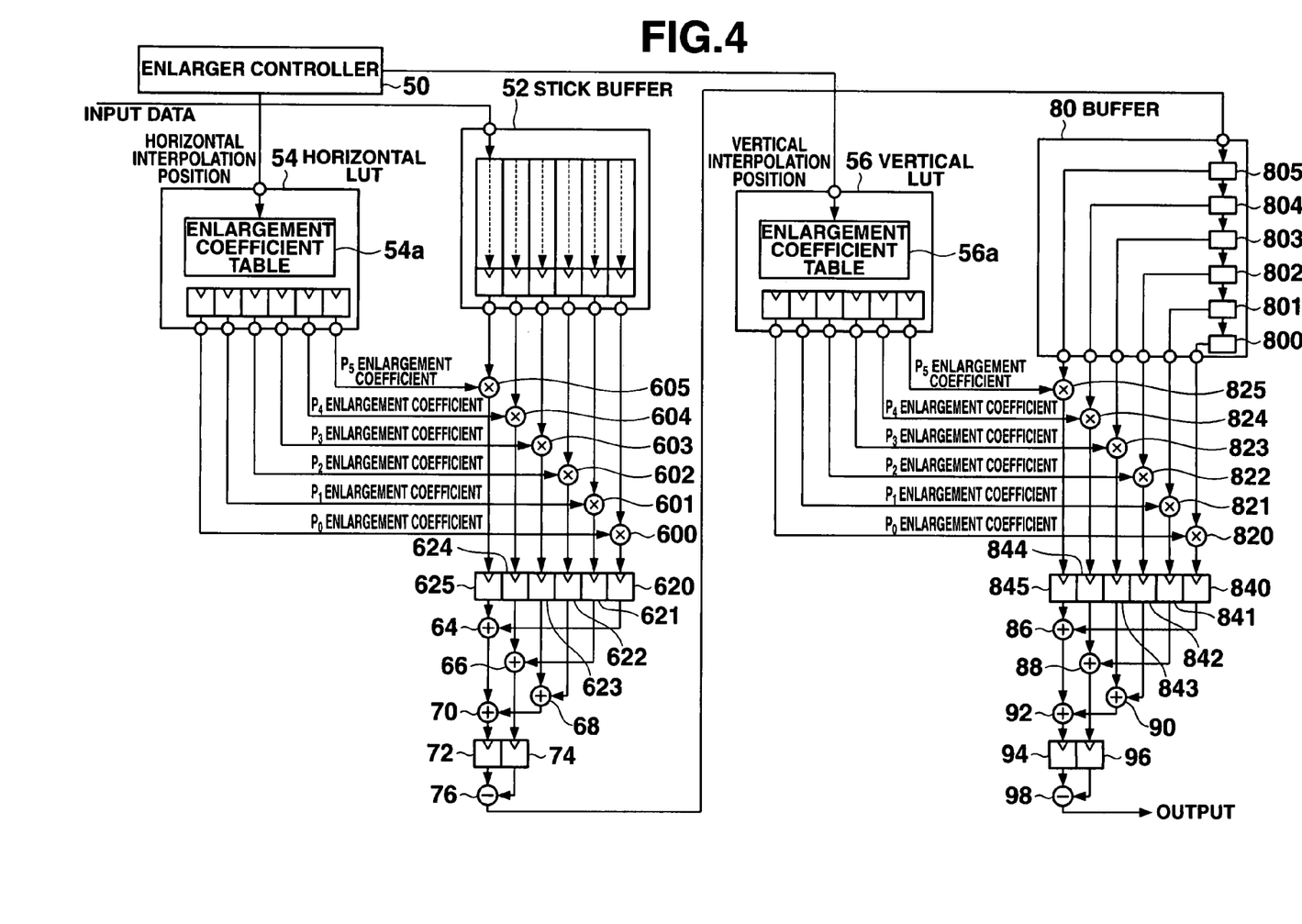
FIG. 4 is a block diagram of the enlargement interpolation section shown in FIG. 1.

Next, the pixel interpolation device (enlargement interpolation section 17a) of this embodiment arranged taking the aforementioned restrictions 1, 2 and 3 into consideration will be described in detail. FIG. 4 is a block diagram of the enlargement interpolation section 17a of this embodiment. Suppose that the enlargement interpolation section 17a is arranged to create pixel data in the interpolation position on the basis of pixel data from existing pixels arranged in a 6 by 6 matrix form by way of example.

In FIG. 4, an enlarger controller 50, which is adapted to control interpolation based on pixel data from 6×6 existing pixels, outputs horizontal interpolation position data indicating the interpolation position in the horizontal direction to a horizontal LUT (lookup table) section 54. The controller further outputs vertical interpolation position data indicating the interpolation position in the vertical direction to a vertical LUT section 56.

A stick buffer section 52, which is adapted to buffer pixel data, comprises six buffers arranged in parallel in the horizontal direction each of which holds input pixel data in the vertical direction. From the stick buffer 52 thus arranged are output pixel data from the six existing pixels P0 through P5 shown in FIG. 2. In the description which follows, P0 through P5 may denote pixel data.

The horizontal LUT section 54 is provided with an enlargement coefficient table 54a, which is stored with coefficient data used in performing interpolation operations in the horizontal direction on pixel data held in the stick buffer section 54. The horizontal LUT section 54 receives horizontal interpolation position data from the enlarger controller 50 and outputs coefficient data (enlargement coefficients) for pixel data P0 to P5 from pixels close to the interpolation position in the horizontal direction. The horizontal LUT section 54 selects and divides data stored in the enlargement coefficient table 54a to output coefficient data for neighbor positions according to the structure of coefficient data in the coefficient table, that is, according to which of structures shown in FIGS. 6A to 6C the coefficient data has.

Multipliers 600 to 605 multiply pixel data P0 to P5 in the horizontal direction output from the stick buffer section 52 and coefficient data for neighbor positions output from the horizontal LUT section 54. For example, the multiplier 600 multiplies pixel data from the pixel P0 and coefficient data for the pixel P0.

Registers 620 to 625 each store pixel data from a corresponding one of the multipliers 600 to 605. For example, the register 600 holds output data from the multiplier 600.

An adder 64 adds data held in the registers 620 and 625 together. An adder 65 adds data held in the registers 621 and 624 together. An adder 68 adds data held in the registers 622 and 623 together. An adder 70 adds the outputs of the adders 64 and 68 together. That is, the sum of the results of operations on pixel data from odd-numbered pixels counted from the interpolation position is calculated through the adders 64, 68, and 70. The sum of the results of operations on pixel data from even-numbered pixels counted from the interpolation position is calculated through the adder 66.

A register 72 holds output data of the adder 70, i.e., the sum of the results of operations on pixel data from the odd-numbered pixels (the first and third neighbor pixels) from the interpolation position. A register 74 holds output data of the adder 66, i.e., the sum of the results of operations on pixel data from the even-numbered pixels (the second neighbor pixels) from the interpolation position.

A subtracter 76 subtracts the output data of the register 74 from the output data of the register 72, i.e., subtracts the sum of the results of operations on pixel data from the even-numbered pixels from the sum of the results of operations on pixel data from the odd-numbered pixels.

That is, through the use of the multipliers 600 to 605, the adders 64, 66, 68 and 70 and the subtracter 76, operations are performed on pixel data from n-th neighbor pixels from the interpolation position with the result of operations as a negative value if n is odd and as a positive value if n is odd. Therefore, even if all the coefficient data output from the horizontal LUT section 54 is positive, the results of multiplication involving negative coefficients can be obtained.

Thereby, pixel data Pt in the interpolation position can be created on the basis of six pieces of pixel data P0 to P5 on the same line in the horizontal direction and coefficient data stored in the horizontal LUT section 54.

A buffer section 80 has registers 800 to 805 to sequentially hold the results of operations by the subtracter 76 (pixel data in the interpolation position in the horizontal direction). The buffer section 80 holds six pieces of pixel data Pt0 to Pt5 located on the same line in the vertical direction, each of which corresponds to the interpolated pixel data Pt on a corresponding one of the six lines in the horizontal direction.

A vertical LUT section 56 is provided with an enlargement coefficient table 56a stored with coefficient data used in performing interpolation operations in the vertical direction on the pixel data held in the buffer section 80. The vertical LUT section 56 receives vertical interpolation position data from the enlarger controller 50 and outputs coefficient data (enlargement coefficients) for the interpolated pixel data Pt0 to Pt5 close to the interpolation position in the vertical direction.

Multipliers 820 to 825 multiply pixel data Pt0 to Pt5 in the horizontal direction output from the buffer section 80 and coefficient data for neighbor positions output from the vertical LUT section 56. For example, the multiplier 820 multiplies pixel data Pt0 from the register 800 in the buffer 80 and coefficient data (P0 enlargement coefficient) for the interpolation position.

Registers 840 to 845 each store pixel data which is output from a corresponding one of the multipliers 820 to 825. For example, the register 840 holds output data from the multiplier 820.

An adder 86 adds data held in the registers 840 and 845 together. An adder 88 adds data held in the registers 841 and 844 together. An adder 90 adds data held in the registers 842 and 843 together. An adder 92 adds the outputs of the adders 86 and 90 together. That is, the sum of the results of operations on pixel data from odd-numbered pixels is calculated through the adders 86, 90, and 92. The sum of the results of operations on pixel data from even-numbered pixels is calculated through the adder 88.

A register 94 holds output data of the adder 92, i.e., the sum of the results of operations on pixel data from the odd-numbered pixels (the first and third neighbor pixels). A register 96 holds output data of the adder 90, i.e., the sum of the results of operations on pixel data from the even-numbered pixels (the second neighbor pixels).

A subtracter 98 subtracts the output data of the register 96 from the output data of the register 94, i.e., subtracts the sum of the results of operations on pixel data from the even-numbered pixels from the sum of the results of operations on pixel data from the odd-numbered pixels.

That is, through the use of the multipliers 820 to 825, the adders 86, 88, 90 and 92 and the subtracter 98, operations are performed on pixel data from n-th neighbor pixels from the interpolation position with the result of operations as a negative value if n is odd and as a positive value if n is odd. Therefore, even if all the coefficient data output from the vertical LUT section 56 is positive, the results of multiplication involving negative coefficients can be obtained.

Thereby, pixel data P in the interpolation position can be output on the basis of six pieces of pixel data Pt0 to Pt5 on the same line in the vertical direction and coefficient data stored in the vertical LUT section 56.

Specific examples of coefficient data stored in the enlargement coefficient tables 54a and 56a will be described next.

Figure 5A:
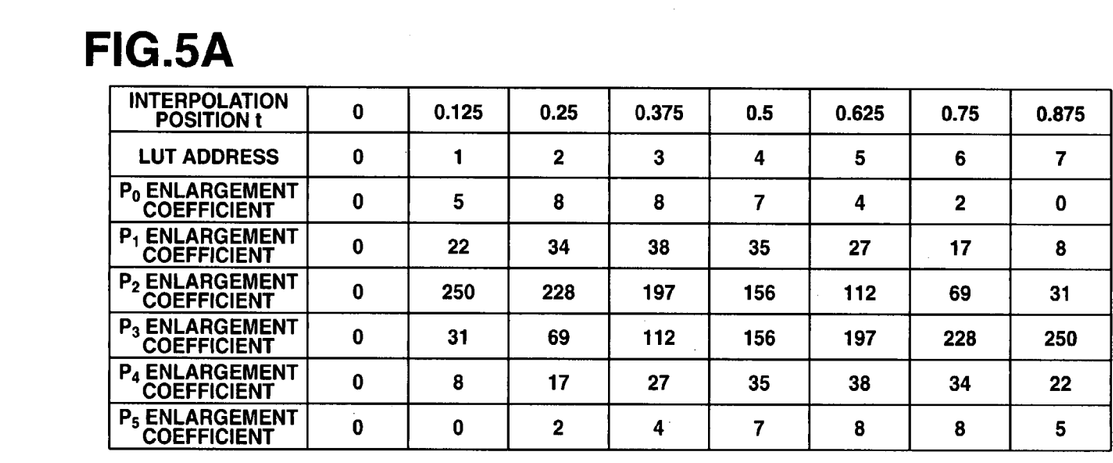
FIGS. 5A and 5B show exemplary enlargement coefficients for pixel data from first to third neighbor pixels when normalized to 256.

FIG. 5A shows one example of enlargement coefficient data for first to third neighbor pixel data when normalized to 256. The interval between adjacent pixels is divided by eight and the position of one of the resulting dividing points is specified as the interpolation position by horizontal or vertical interpolation position data. In FIG. 5A is shown coefficient data for neighbor pixels P0 to P5 when the interpolation position (t) is set to each of 0, 0.125, 0.25, 0.375, ..., and 0.875. Each coefficient data used in this embodiment is set to have a positive value.

In the example of FIG. 5, the interval between adjacent existing pixels is divided by eight and hence eight pieces of coefficient data are set to each of the existing pixels P0 to P5. The number of pieces of coefficient data set to each of the existing pixels is determined according to the resolution (the number of divisions).

For coefficient data 0 for the pixel P2 when the interpolation position is 0, pixel data from the pixel P2 is output as the result of operations.

Figure 5B:
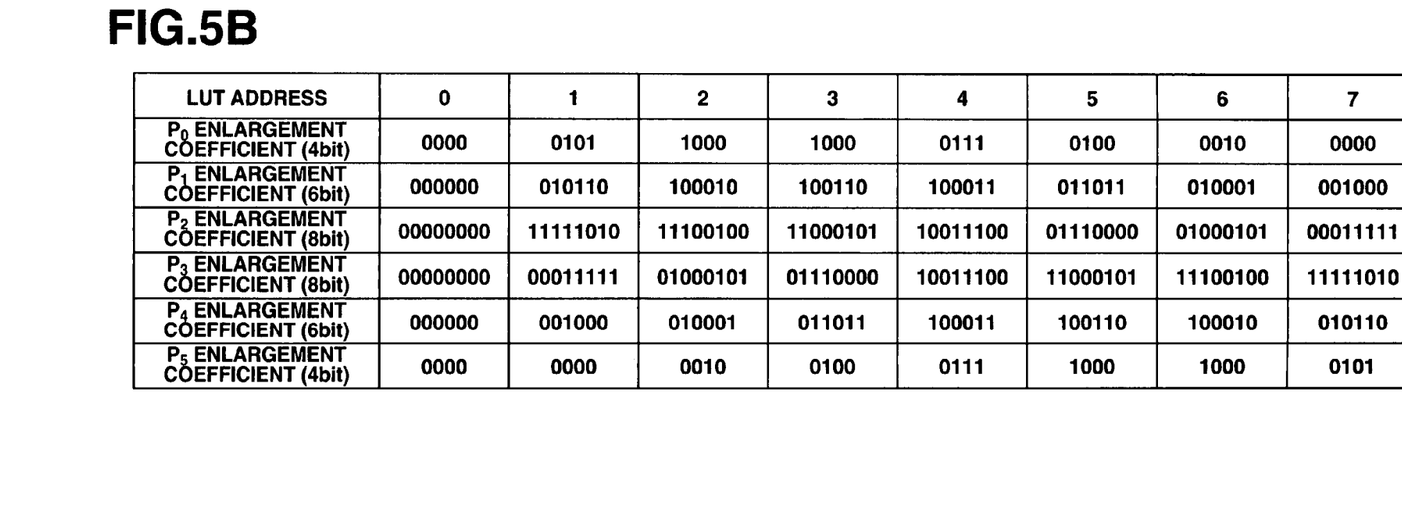

FIG. 5B shows an example of coefficient data in which the values normalized to 256 shown in FIG. 5A are represented in binary form. As shown in FIG. 5B, each coefficient data has its bit width fixed according to its magnitude.

That is, the coefficient data for the first neighbor pixels P2 and P3 is represented by eight bits. The coefficient data for the second neighbor pixels P1 and P4 is represented by six bits. The coefficient data for the third neighbor pixels P0 and P5 is represented by four bits. That is, the more distant pixels are from the interpolation position, the shorter the bit width of coefficient data for them is set. This allows the effect on interpolation to be lessened and the circuit scale of the horizontal LUT section 54 (enlargement coefficient table 54a) and the vertical LUT section 56 (enlargement coefficient table 56a) to be reduced.

Figure 6A:
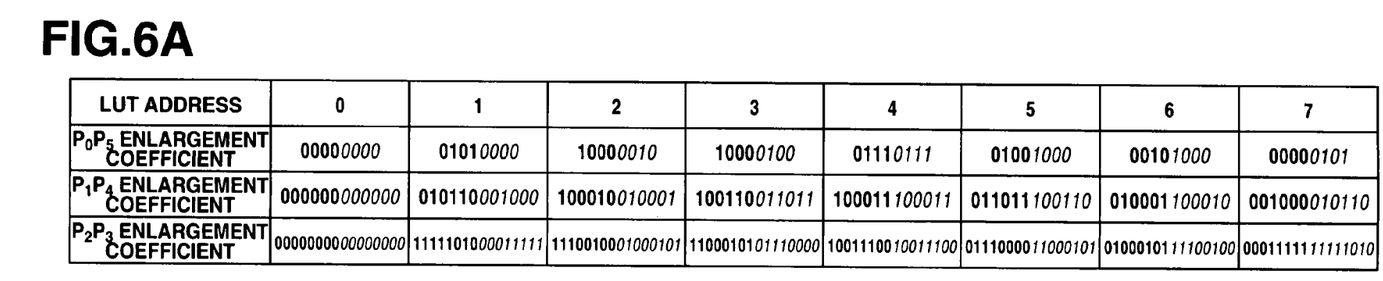
FIGS. 6A, 6B and 6C show exemplary coefficient data to be stored in the enlargement coefficient tables shown in FIG. 4.

FIG. 6A shows one example of coefficient data stored in the enlargement coefficient tables 54a and 56a of this embodiment configured based on the table shown in FIG. 5B.

The table of FIG. 6A is configured such that two pieces of coefficient data for the first neighbor pixels P2 and P3 are stored as one piece of data. In this example, the coefficient data for the pixel P2 and the coefficient data for the pixel P3 (indicated by slant characters) are arranged as high-order bits and low-order bits, respectively, of one piece of data. The coefficient data for the first two neighbor pixels is set to 16 bits in width as the result of being combined into one piece of data.

For the n-th neighbor pixels (e.g., P2 and P3), there is only one combination of coefficient data therefor for each interpolation position. Therefore, if the interpolation position is determined, one piece of coefficient data can be read. When the distance between the pixel P2 and the interpolation position Pt is t, the coefficient data for 1−t is simply used for the pixel P3.

Similarly, for the second and third neighbor pixels (P1, P4; and P0, P5) as well, the coefficient data therefore are combined and stored in the table as one piece of coefficient data. Therefore, the coefficient data for the second neighbor pixels P1 and P4 is 12 bits in width and the coefficient data for the third neighbor pixels P0 and P5 is 8 bits in width.

In this case, the horizontal LUT section 54 reads coefficient data for neighbor pixels stored in a location specified by an LUT address indicated by horizontal interpolation position data from the enlarger controller 50 from the enlargement coefficient table 54a and outputs them with division.

For example, when one piece of coefficient data "1110010001000101" for the pixels P2 and P3 in a location specified by the LUT address 2 is read from the coefficient table 54a, its high-order bits "11100100" are output to the multiplier 602 as coefficient data for the pixel P2 and the low-order bits "01000101" are output to the multiplier 603 as coefficient data for the pixel P3. Similarly, for the pixels P0 and P5 as well, one piece of coefficient data is read and then divided so that its high-order bits and low-order bits are applied to the multipliers 600 and 605, respectively. For the pixels P1 and P4 as well, one piece of coefficient data is read and then divided so that its high-order bits and low-order bits are applied to the multipliers 601 and 604, respectively.

In the vertical LUT section 56, as in the horizontal LUT section 54, one piece of coefficient data is read from the enlargement coefficient table 56a and its data is divided into high-order bits and low-order bits for application to the multipliers 820 to 825. Further description is omitted.

Thus, as shown in FIG. 6A, two pieces of coefficient data for pixel data from the two n-th neighbor pixels are stored, not individually, but in combination into the coefficient tables 54a and 56b as one piece of data, allowing coefficient data for n-th neighbor pixels to be shared. With interpolation based on 6×6 existing pixels, therefore, coefficient data for three neighbor positions are simply stored in the tables.

Figure 6B:
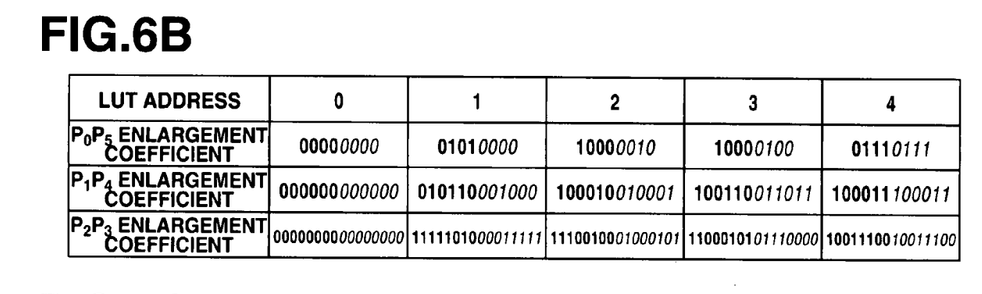

FIG. 6B shows an example of a table configured to allow the circuit scale to be further reduced on the basis of the coefficient data shown in FIG. 6A.

The table of FIG. 6B is configured to store coefficient data for interpolation positions from t=0 through t=0.5 of the coefficient data shown in FIG. 6A.

Two pieces of coefficient data for n-th neighbor pixel data are symmetrical with respect to the center of the first neighbor existing pixels and therefore the same. From t=1−t', the combination of coefficient data when t=0 to 0.5 and the combination of coefficient data when t'=0 to 0.5 are equal to each other. Therefore, the enlargement coefficient tables 54a and 56a simply store coefficient data corresponding to half of the interpolation position resolution.

In this case, the horizontal LUT section 54 reads from the coefficient table 54a coefficient data for neighbor pixels specified by an LUT address indicated by horizontal interpolation position data from the enlarger controller 50 and outputs them with division. The coefficient data designated by LUT addresses 0 to 4 are the same as when the table of FIG. 6A is used.

When the horizontal interpolation position data indicates 0.625, 0.75, or 0.875 (when the LUT address is 5, 6, or 7 in FIG. 6A), one piece of coefficient data is read from a location specified by the LUT address 1, 2, or 3 according to the interpolation position. That is, when the horizontal interpolation position data indicates 0.625 as interpolation position, coefficient data is read from the location identified by the LUT address 3. When the horizontal interpolation position data indicates 0.75, coefficient data is read from the location identified by the LUT address 2. When the horizontal interpolation position data indicates 0.875, coefficient data is read from the location identified by the LUT address 1.

Suppose, for example, that, when the horizontal interpolation position data indicates 0.75, one piece of coefficient data "1110010001000101" for the pixels P2 and P3 has been read from the location identified by the LUT address 2. In this case, the low-order bits "01000101" are output to the multiplier 602 as coefficient data for the pixel P2 and the high-order bits "11100100" are output to the multiplier 603 as coefficient data for the pixel P3, which differs from the allocation of coefficient data when the interpolation position is 0.25. With the pixels P0 and P5 or P1 and P4 as well, one piece of coefficient data is read and divided for each pixel. Each divided coefficient data is selectively applied to the multiplier 600, 601, 604, or 605.

In the vertical LUT section 56, as in the horizontal LUT section 54, one piece of coefficient data is read from the coefficient table 56a and divided. Each divided coefficient data is selectively applied to the multiplier 820, 821, 822, 823, 824, or 825. In this case, when the interpolation position is 0.625, 0.75, or 0.875, the high-order bits and the low-order bits are interchanged. Further description is omitted.

Thus, as shown in FIG. 6B by configuring the tables to record coefficient data corresponding to interpolation positions through the center (t=0.5), it becomes possible to reduce the amount of coefficient data to be stored in the coefficient tables 54a and 56a and simplify the control circuits of the horizontal and vertical LUT sections 54 and 56. As the result, the circuit scale can be reduced.

Figure 6C:
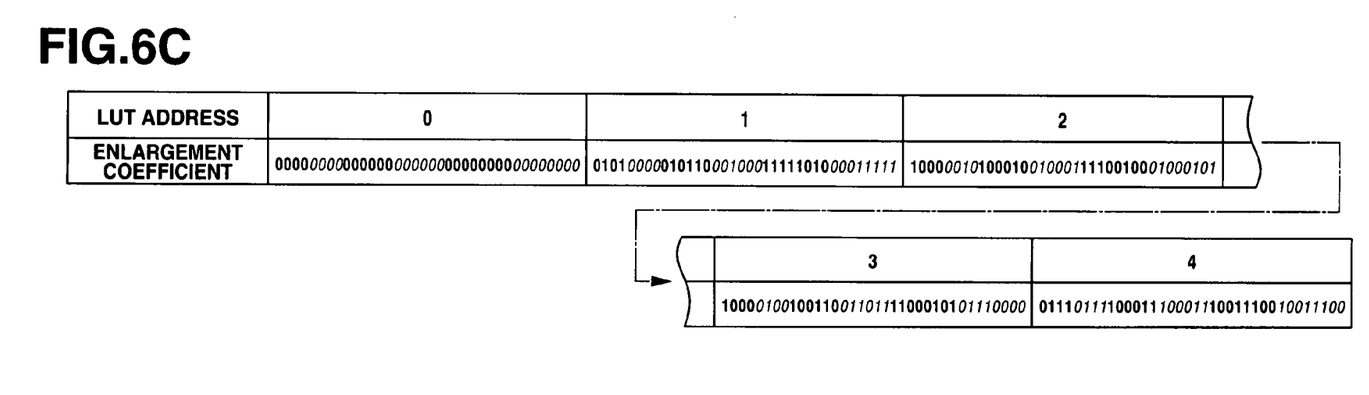

FIG. 6C shows an example of a table configured to further reduce the circuit scale on the basis of the coefficient data shown in FIG. 6C.

The table of FIG. 6C is configured such that three pieces of coefficient data for each interpolation position are arranged in series and stored as one piece of data.

In this case, the horizontal LUT section 54 reads one piece of coefficient data for neighbor pixels from a location in the table 54a identified by an LUT address corresponding to horizontal interpolation position data from the controller 50 and then divides it for each neighbor pixel.

When the horizontal interpolation position data indicates 0.625, 0.75, or 0.875 (when the LUT address is 5, 6, or 7 in FIG. 6A), one piece of coefficient data is read from a location designated by the LUT address 1, 2, or 3 according to the interpolation position in the same way as when the table of FIG. 6B is used.

For example, when the horizontal interpolation position data indicates 0.75, one piece of coefficient data "10000010100010010001111001000100101" in which individual data for the pixels P0 and P5, P1 and P4, P2 and P3 are arranged is read from the location identified by the LUT address 2.

The read coefficient data is divided into the bit widths corresponding to the first, second and third neighbor pixels P0 and P5, P1 and P4, and P2 and P3. That is, the coefficient data is divided into the high-order 8 bits for the third neighbor pixels P0 and P5, the intermediate 12 bits for the second neighbor pixels P1 and P4, and the low-order 16 bits for the first neighbor pixels P2 and P3.

Each divided coefficient data is further divided for each of the corresponding neighbor pixels. The divided coefficient data corresponding to each of the pixels is output to a corresponding one of the multipliers 600 to 605 in the same way as when the table of FIG. 6B is used.

In the vertical LUT section 56 as well, one piece of coefficient data is read from the coefficient table 56a and divided into the bit widths corresponding to the first, second and third neighbor pixels P0 and P5, P1 and P4, and P2 and P3. Each divided coefficient data is further divided for each of the corresponding neighbor pixels. The divided coefficient data corresponding to each of the pixels is output to a corresponding one of the multipliers 820 to 825.

Thus, as shown in FIG. 6C by configuring the tables to record one piece of coefficient data for each of the interpolation positions (LUT addresses), it becomes possible to reduce the amount of coefficient data to be stored in the coefficient tables 54a and 56a and reduce addresses for reading coefficient data for each interpolation position, allowing the circuit scale to be reduced.

The embodiment has been described in terms of an example where the enlargement coefficients are set on the basis of the sinc function or the sinc function having its characteristic restricted to a finite range. Functions other than the sinc function can also be used if the characteristic of the function of enlargement coefficients is the same. For example, the invention is also applicable to the case where bilinear (linear) interpolation, hyperbolic third-order spline interpolation, bicubic interpolation, or the like is used.

In the embodiment, all the coefficient data output from the horizontal and vertical LUT sections 54 and 56 are set to positive values, and operations are carried out with and with the results of operations for even-numbered pixels as negative values and the results of operations for odd-numbered pixels as positive values through the use of the adders, 64, 66, 68, and 70 and the subtracter 76 for the horizontal interpolation and the adders 86, 88, 90, and 92 for the vertical interpolation. By outputting each coefficient data from the horizontal and vertical LUT sections 54 and 56 with a sign added, the arrangement of the operation circuit can be simplified. In this case, it is only required to store positive coefficient data in the coefficient tables 54a and 56a and output coefficient data only for even-numbered pixels with a sign added. Thereby, the results of operations by the multipliers are simply added, allowing the circuit arrangement to be simplified.

Although, in FIG. 1, the enlargement interpolation section 17a is shown built into the color process circuit 17, it may be built into another module which carries out image enlargement processing.

Although the embodiment has been described in terms of image enlargement interpolation, the present invention is also applicable to image reduction interpolation.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. A pixel interpolation device comprising:
   a capture unit which captures pixel data from existing pixels arranged at regular intervals;
   a specify unit which specifies an interpolation position in which an interpolated pixel is to be located;
   a pixel data output unit which outputs the pixel data from multiple existing pixels located close to the interpolation position specified by the specify unit from the pixel data captured by the capture unit;
   a storage unit which has previously stored multiple coefficient data according to a positional relationship between the interpolated pixel and the existing pixels;
   a coefficient data output unit which outputs from the storage unit multiple pieces of the coefficient data for the pixel data from the existing pixels output by the pixel data output unit; and
   an image data creation unit which creates pixel data in the interpolated position specified by the specify unit by performing predetermined operations on the pixel data output by the pixel data output unit and the coefficient data output by the coefficient data output unit,
   wherein the storage unit stores either of coefficient data when the existing pixels are in a first direction with respect to the interpolated pixel and coefficient data when the existing pixels are in a second direction opposite to the first direction with respect to the interpolated pixel, and
   wherein the coefficient data output unit outputs the coefficient data when the existing pixels are in the first direction with respect to the interpolated pixel and the coefficient data when the existing pixels are in the second direction with respect to the interpolated pixel based on the coefficient data stored in the storage unit.

2. The pixel interpolation device according to claim 1, wherein the storage unit stores coefficient data with no sign, and the coefficient data output unit outputs coefficient data with a sign added according to whether each existing pixel is an odd- or even-numbered one from the interpolated pixel.

3. A camera comprising:
   a pixel interpolation device;
   an image capture unit which captures an image of a subject to obtain image data; and
   a recording unit which records an enlarged or reduced image data obtained by the pixel interpolation device performing pixel interpolation on the image data obtained by the image capture unit in order to enlarge or reduce the image data, the pixel interpolation device including:
   a capture unit which captures pixel data from existing pixels arranged at regular intervals;
   a specify unit which specifies an interpolation position in which an interpolated pixel is to be located;
   a pixel data output unit which outputs the pixel data from multiple existing pixels located close to the interpolation position specified by the specify unit from the pixel data captured by the capture unit;
   a storage unit which has previously stored multiple coefficient data according to a positional relationship between the interpolated pixel and the existing pixels;
   a coefficient data output unit which outputs from the storage unit multiple pieces of the coefficient data for the pixel data from the existing pixels output by the pixel data output unit; and
   an image data creation unit which creates pixel data in the interpolated position specified by the specify unit by performing predetermined operations on the pixel data output by the pixel data output unit and the coefficient data output by the coefficient data output unit,
   wherein the storage unit stores either of coefficient data when the existing pixels are in a first direction with respect to the interpolated pixel and coefficient data when the existing pixels are in a second direction opposite to the first direction with respect to the interpolated pixel, and
   wherein the coefficient data output unit outputs the coefficient data when the existing pixels are in the first direction with respect to the interpolated pixel and the coefficient data when the existing pixels are in the second direction with respect to the interpolated pixel based on the coefficient data stored in the storage unit.

4. A pixel interpolation device comprising:
   a capture unit which captures pixel data of multiple existing pixels arranged at regular intervals;
   a specify unit which specifies an interpolation position in which an interpolated pixel is to be located;
   a pixel data output unit which outputs the pixel data corresponding to multiple existing pixels present within a predetermined range from the interpolation position specified by the specify unit, of the pixel data of the multiple existing pixels captured by the capture unit;

a storage unit which preliminarily stores multiple coefficient data corresponding to a positional relationship between the interpolated pixel and the existing pixels;

a coefficient data output unit which outputs the multiple coefficient data corresponding to the multiple existing pixels for which the pixel data is output from the pixel data output unit, of the multiple coefficient data stored in the storage unit; and a creation unit which creates pixel data in the interpolated position specified by the specify unit by performing predetermined operations on the pixel data of the multiple existing pixels output by the pixel data output unit and the multiple coefficient data output by the coefficient data output unit, wherein the storage unit groups the multiple coefficient data different in positional relationship between the interpolated pixel and the existing pixels, and stores any one piece of the multiple coefficient data included in the same group, wherein the coefficient data output unit outputs the multiple coefficient data included in each of the groups, based on the one piece of the multiple coefficient data stored in association with each of the groups by the storage unit, wherein the storage unit groups the multiple coefficient data according to a distance between the interpolated pixel and the existing pixels, and stores either of coefficient data in a case where the existing pixels are in a first direction with respect to the interpolated pixel and coefficient data in a case where the existing pixels are in a second direction opposite to the first direction with respect to the interpolated pixel, and wherein the coefficient data output unit outputs both the coefficient data in the case where the existing pixels are in the first direction with respect to the interpolated pixel and the coefficient data in the case where the existing pixels are in the second direction opposite to the first direction with respect to the interpolated pixel, in accordance with either of the coefficient data stored in the storage unit.

5. The pixel interpolation device according to claim 4, wherein the storage unit stores coefficient data with no sign, and the creation unit determines a sign of the coefficient data corresponding to each of the existing pixels according to whether each of the existing pixels is an odd- or even-numbered pixel with respect to the interpolated pixel, and performs the predetermined operations.

6. The pixel interpolation device according to claim 5, wherein the storage unit stores all of the multiple coefficient data different in positional relationship between the interpolated pixel and the existing pixels, in a register having a predetermined number of bits.

7. The pixel interpolation device according to claim 6, wherein as the distance between the interpolated pixel and the existing pixels is longer, the storage unit utilizes the register having a smaller number of bits for storing the coefficient data corresponding to the existing pixels.

8. The pixel interpolation device according to claim 7, wherein the storage unit stores the coefficient data according to which position from the interpolated pixel the existing pixels subjected to the operations have.

9. The pixel interpolation device according to claim 8, wherein the storage unit stores the coefficient data according to a positional difference of the interpolated pixel within the intervals at which the multiple existing pixels are arranged.

10. The pixel interpolation device according to claim 9, wherein the storage unit stores the coefficient data based on a predetermined even function.

11. The pixel interpolation device according to claim 4, further comprising:

an image pickup unit which takes an image of an object and obtains image data;

a recording unit which records the image data obtained by the image pickup unit; and a direction unit which directs either of magnification and reduction of the image data, wherein the recording unit records the image data based on the pixel data created by the creation unit when either of the magnification and the reduction of the image data is directed by the direction unit.

12. The pixel interpolation device according to claim 11, wherein the specify unit specifies the interpolation position according to the direction from the direction unit.

* * * * *